United States Patent [19]

Fernström et al.

[11] 4,140,446

[45] Feb. 20, 1979

[54] ROTARY PNEUMATIC TOOL WITH VIBRATION ABSORBING MEANS

[75] Inventors: Harry G. Fernström, Saltsjö-Boo; Bo R. Lindqvist, Älta; Knut C. Schoeps, Tyresö; Lars T. Skogsberg, Stenhamra, all of Sweden

[73] Assignee: Atlas Copco Aktiebolag, Nacka, Sweden

[21] Appl. No.: 835,790

[22] Filed: Sep. 22, 1977

[30] Foreign Application Priority Data

Sep. 23, 1976 [SE] Sweden ............................... 7610522

[51] Int. Cl.$^2$ ........................ F01C 13/02; F01C 21/00; F16M 1/04

[52] U.S. Cl. ...................................... 418/270; 415/503

[58] Field of Search ......................... 418/70, 270, 181; 415/503; 173/139, 162, 163

[56] References Cited

U.S. PATENT DOCUMENTS

| | | | |
|---|---|---|---|
| 2,019,964 | 11/1935 | Hamerly | 173/162 |
| 3,218,028 | 11/1965 | Borden | 415/503 |
| 3,471,125 | 10/1969 | Taubald et al. | 415/503 |
| 3,756,328 | 9/1973 | Sudnishnikov et al. | 173/139 |
| 3,827,834 | 8/1974 | Kakimoto | 418/70 |

FOREIGN PATENT DOCUMENTS

| | | | |
|---|---|---|---|
| 2214031 | 10/1972 | Fed. Rep. of Germany | 415/503 |

*Primary Examiner*—John J. Vrablik
*Attorney, Agent, or Firm*—Flynn & Frishauf

[57] ABSTRACT

A rotary pneumatically powered tool comprising a housing, a motor assembly mounted in the housing and comprising a pneumatic motor for rotating an output shaft, and vibration absorbing mounting means for supporting and vibration insulating the motor assembly relative to the housing. The vibration absorbing means comprises a resilient connection piece for cramping the motor assembly axially in the housing and for interconnecting air passages in the motor assembly and the housing so as to enable communication of pressure air to and from the pneumatic motor of the motor assembly.

4 Claims, 2 Drawing Figures

ROTARY PNEUMATIC TOOL WITH VIBRATION ABSORBING MEANS

BACKGROUND OF THE INVENTION

This invention relates to a rotary pneumatic tool comprising a housing, a motor assembly mounted in the housing for rotating an output shaft, and vibration absorbing means for insulating the housing from the motor assembly, thereby preventing noise generating vibrations in the motor assembly from being transferred to the housing.

Previously, there have been proposed various types of vibration insulating arrangements at power tools to the protection of the operator. In British Pat. No. 1,437,304 there is disclosed an elastically powered grinding tool in which the motor is insulated from an external housing by means of resilient bridge means in order to inhibit transmission of noise generating vibrations to the housing.

The present invention intends to solve the problem of how to communicate pressure air to and from a pneumatically powered motor assembly resiliently mounted in a power tool housing of a type similar to that disclosed in the above cited British Pat. No. 1,437,304.

The above problem is solved by the invention as it is defined in the claims.

DETAILED DESCRIPTION

Figure 2:
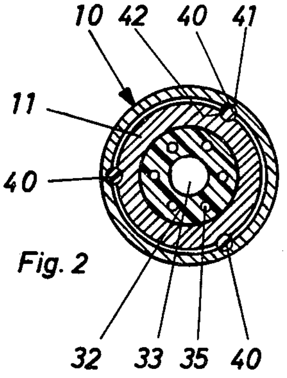
FIG. 2 shows a cross section along line II:II in FIG. 1.
Figure 1:
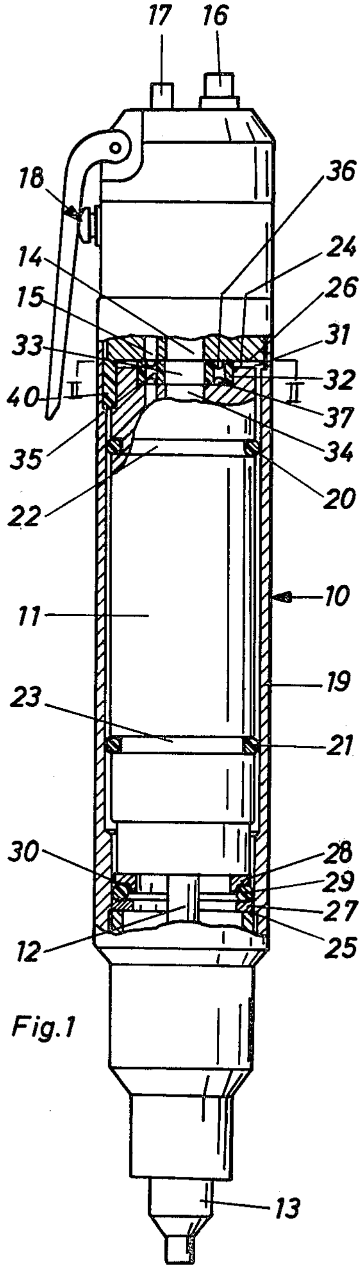
FIG. 1 shows a partly broken side elevation of a hand held pneumatic screw driver constructed in accordance with the invention.

The tool shown in the drawing comprises a housing 10 and a motor assembly 11 enclosed therein. The motor assembly 11 comprises a pressure air driven vane motor and one or more reduction gearings (not shown). Through a shaft 12, the motor assembly 11 is connected to a torque limiting clutch (not shown) and an output shaft 13. At its rear end the motor assembly 11 is provided with an air supply passage 14 and one or more air exhaust passages 15. In the drawing there is shown one exhaust passage 15 only, but in practice there are more in order to increase the total fluid passage cross section.

These passages, which at their forward ends communicate with the pneumatic motor, extend through the rear part of the housing 10 and are arranged to be connected to a pressure air hose and an exhaust air hose, respectively, by means of nipples 16 and 17. (The hoses are not shown). The rear part of the housing 10 also lodges a supply valve 18 for controlling the air supply to the motor.

The motor assembly 11, which externally has the form of a circular cylinder, is enclosed in a central tube-shaped part 19 of the housing 10 and is supported radially against the latter by means of two resilient O-rings 20 and 21. These O-rings are fixed in peripheral grooves 22 and 23 in the motor assembly 11, and are arranged to radially support the motor assembly 11 in the housing 10.

In its axial direction, the motor assembly 11 is cramped between a rearwardly facing shoulder 25 in the forward part of the housing 10 and a transverse wall 26 in the rear part of the housing 10.

Between the forward end of the motor assembly 11 and the shoulder 25, there are two support rings 27 and 28 and an O-ring 29 located therebetween. The latter is intended to cramp the motor assembly 11 axially in the housing 10, while insulating against vibrations. The ring 28, which is in direct contact with the motor assembly 11, is kept out of contact with the housing 10 in that it has an outer diameter which is less than the inner diameter of the housing 10 and in that it is formed with an axially extending centering flange 30 which is arranged to fit into the O-ring 29.

Between the rear end wall 24 of the motor assembly 11 and the transverse wall 26 of the housing 10 there is an air gap 31. This air gap 31 is bridged over by a resilient connection piece 32 which is of annular shape and has a central opening 33 that surrounds and seals off the air supply passage 14.

The connection piece, which preferably is made of rubber, rests in a circular recess 34 in the rear end of the motor assembly 11. The depth of the recess 34 is substantially less than the thickness of the connection piece 32, whereby is ensured that the connection piece 32 only is in contact with the transverse wall 36 and the air gap 31 is maintained.

Further, the connection piece 32 has a number of small lateral openings 35 which are arranged to extend the exhaust air passage 15 past the air gap 31.

As the rear part of the housing 10 is connected to the tube-shaped part 19 by means of a thread joint, the exhaust air passage 15 in the housing 10 will, in exceptional cases only, get a position right opposite to the corresponding part of the passage 15 in the motor assembly 11 as the housing 10 is assembled. In order to ensure a proper fluid connection despite that, the connection piece 32 is on its both sides formed with annular grooves 36 and 37 which maintain a continuous communication between the lateral openings 35.

Accordingly, the connection piece 32 is intended to serve as a vibration insulating and axial force transmitting means as well as a seal means for the air passages 14 and 15.

In order to transfer to the housing 10 the torque reaction arising in the motor assembly 11 at operation, there are mounted three keys 40 (see FIG. 2) between the housing 10 and the motor assembly 11. These keys are lodged in axial, opposite grooves 41 and 42 in the housing 10 and the motor assembly 11. The keys are made of a resilient material like plastic and are arranged to transfer tangential forces between the housing 10 and the motor assembly 11 while insulating against vibration.

The obtained sound insulating effect is very high. At comparison of two pneumatic nut runners of the same type and size, one of which is of a conventional type and the other constructed in accordance with the invention, the conventional machine causes a vibration generated noise level of about 75 dBA, whereas the noise level of the machine according to the invention is only about 55 dBA, which means that the noise level is lowered by as much as 20 dBA.

By the invention there is accomplished a simple and compact air passage bridging arrangement between the motor assembly and the housing, which arrangement neither impairs the sound dampening nor influences too much upon the weight and the external dimensions of the machine. The latter is of great importance for hand held machines.

The embodiments of the invention are not limited to the shown and described example, but can be freely varied within the scope of the invention as it is defined in the claims.

What we claim is:

1. In a rotary pneumatic tool comprising a generally tubular housing (10), a motor assembly (11) of generally cylindrical outer shape mounted in the housing (10) and arranged to rotate an output shaft (13), passages (14,15) in the housing (10) and the motor assembly (11) for communicating pressure air to and from the motor assembly (11), and vibration absorbing means (20,21, 32,40) resiliently mounting the motor assembly (11) in the housing (10), the improvement wherein:

said vibration absorbing means comprises a resilient connection piece (32) which is arranged to axially support said motor assembly (11) relative to said housing (10); and through passages (33,35) are provided in said resilient connection piece (32) for interconnecting said pressure air passages (14,15) in said housing (10) and said motor assembly (11).

2. Rotary pneumatic tool according to claim 1, wherein said connection piece (32) is annular, and has one central opening (33) and at least one opening (35) laterally located relative to said central opening (33).

3. Rotary pneumatic tool according to claim 1, wherein said vibration absorbing means (20,21,32,40) comprises at least one O-ring (20,21) which is arranged to resiliently support said motor assembly (11) in radial directions relative to said housing (10).

4. Rotary pneumatic tool according to claim 1, comprising opposite, axially directed grooves (41,42) in said housing (10) and in said motor assembly (11), and wherein said vibration absorbing means (20,21,32,40) comprises at least two resilient key members (40) mounted in said opposite, axially directed grooves (41,42) to support said motor assembly (11) tangentially relative to said housing (10).

* * * * *